US008302857B2

(12) United States Patent
Tatai et al.

(10) Patent No.: US 8,302,857 B2
(45) Date of Patent: Nov. 6, 2012

(54) TAMPER DETECTION MECHANISM AND CARD PROCESSING DEVICE

(75) Inventors: Toshio Tatai, Nagano (JP); Chisato Hiyama, Nagano (JP); Kazunori Takahashi, Nagano (JP)

(73) Assignee: Nidec Sankyo Corporation (JP)

( * ) Notice: Subject to any disclaimer, the term of this patent is extended or adjusted under 35 U.S.C. 154(b) by 1133 days.

(21) Appl. No.: 12/183,114

(22) Filed: Jul. 31, 2008

(65) Prior Publication Data

US 2009/0038019 A1 Feb. 5, 2009

(30) Foreign Application Priority Data

Jul. 31, 2007 (JP) ................................ 2007-200239

(51) Int. Cl.
*G06K 5/00* (2006.01)

(52) U.S. Cl. ......... 235/380; 225/492; 340/540; 340/682

(58) Field of Classification Search .................. 235/380, 235/492; 340/540, 682
See application file for complete search history.

(56) References Cited

U.S. PATENT DOCUMENTS

| | | | | |
|---|---|---|---|---|
| 4,951,249 | A * | 8/1990 | McClung et al. | 726/35 |
| 5,117,457 | A * | 5/1992 | Comerford et al. | 713/194 |
| 7,270,275 | B1 * | 9/2007 | Moreland et al. | 235/492 |
| 7,317,401 | B2 * | 1/2008 | Germann et al. | 340/652 |
| 2007/0095172 | A1 * | 5/2007 | Castle et al. | 81/52 |
| 2011/0121967 | A1 * | 5/2011 | Benjelloun et al. | 340/540 |

FOREIGN PATENT DOCUMENTS

JP 2006-180244 7/2006

* cited by examiner

*Primary Examiner* — Allyson Trail
(74) *Attorney, Agent, or Firm* — Cantor Colburn LLP

(57) ABSTRACT

A tamper detection mechanism for detecting tampering when a sub system is removed from a host device may include a screw member that may include a head portion, a major diameter shaft portion and a minor diameter shaft portion. The tamper detection mechanism may also include a through hole provided in the sub system, a lever member, and a detection switch. The lever member may withdraw from said through hole as it is pushed by the major diameter shaft portion when the screw member is tightly screwed, and may advance into the through hole when the screw member is loosened. The detection switch may detect whether the screw member is tightly screwed or loosened based on withdrawal or advancement of the lever member.

9 Claims, 4 Drawing Sheets

TAMPER DETECTION MECHANISM AND CARD PROCESSING DEVICE

CROSS REFERENCE TO RELATED APPLICATIONS

The present application claims priority under 35 U.S.C. §119 to Japanese Application No. 2007-200239 filed on Jul. 31, 2007, the contents of which are incorporated herein by reference.

TECHNICAL FIELD

The present invention relates to a tamper detection mechanism for detecting tampering when a sub system is illegally removed from a host device and a card processing device equipped with the mechanism.

BACKGROUND

Generally, in banking industries, a system is configured such that a host device (such as an ATM) commands a sub system (such as a card reader) to execute processing, and the sub system receives the command and executes the processing, and notifies the host device of the processing result. More specifically, magnetic cards and IC cards are used as cards for cashless [pay] or personal IDs. A magnetic card is a card in which a plastic substrate surface has a magnetic strip formed thereon, and an IC card is a card in which an IC chip is embedded in a plastic substrate; the reading and writing of information with respect to those cards are performed by a sub system (a card processing device (a card reader)) equipped with a magnetic head or IC contacts.

A card processing device is mounted onto a panel of a host device such as an ATM in normal cases. When one attempts to remove the card processing device from the panel by an illegal action, the illegal action can be detected by various methods (see Patent reference 1, for example).

In an IC card reader disclosed in the patent reference 1, when a card processing device is illegally removed from a panel and a physical attack (tampering) is carried out against a code board, tampering is detected by a tamper switch and key information inside the code board is automatically deleted.

Also, one of the requirements of a card reader with a security measure (PCI-PED standard) is that an illegal act is detected as soon as a card reader is removed from a host device. In the card reader with a PCI-PED measure, a lever to press a removal-detection switch SW is provided facing a host device mounting face (panel). By pressing the lever further into the mounting face, the SW is turned ON and the removal of the card reader from the host device is detected.

[Patent Reference 1] Unexamined Japanese Patent Application 2006-180244 (Tokkai) (Paragraph [0009])

However, in the IC card reader described in the above-mentioned patent reference 1 or the above-mentioned card reader with a PCI-PED measure, a protrusion portion for pressing a tamper switch or lever (SW/lever) needs to be provided on the card-reader-mounting face (on the back side of the panel) in the host device on the customer side. Therefore, the host device needs to be modified according to the position of the SW/lever, stroke, etc. Consequently, even if a customer wants to replace a conventional card reader with another new card reader (such as a card reader with a reinforced security function), it could not be replaced without modifying the shape and size of the mounting portion (protrusion portion, etc.).

Therefore, at least an embodiment of the present invention is devised considering the above problems, and at least an embodiment provides a tamper detection mechanism and a card processing device which, while ensuring the security function for detecting the removal of a sub system (a card processing device) from a host device, makes replacement of the sub system (card processing device) in the host device more convenient.

SUMMARY OF THE INVENTION

At least an embodiment of the present invention provides the following:

A tamper detection mechanism for detecting tampering when a sub system is removed from a host device, comprising a screw member which is composed of a head portion, a major diameter shaft portion and a minor diameter shaft portion and fixes the sub system to the host device as a thread portion formed on the minor diameter shaft portion is screwed into a screw hole of the host device, a through hole which is provided in the sub system and through which the major diameter shaft portion passes, a lever member which withdraws from the through hole as it is pushed by the major diameter shaft portion when the screw member is tightly screwed and which advances into the through hole when the screw member is loosened, and a detection switch for detecting the tightly screwed or loosened condition of the screw member based on the withdrawal or advancement of the lever member.

According to at least an embodiment of the present invention, in a tamper detection mechanism for detecting tampering when a sub system is illegally removed from a host device, a screw member composed of a head portion, a major diameter shaft portion and a minor diameter shaft portion, a through hole through which the major diameter shaft portion passes, a lever member which withdraws from the through hole as it is pushed by the major diameter shaft portion when the screw member is tightly screwed and advances into the through hole when the screw member is loosened, and a detection switch for detecting the tightly screwed or loosened condition of the screw member based on the withdrawal or advancement of the lever member; therefore, while the security function is ensured, convenience can be increased.

In other words, the function of the lever member which advances [into the through hole] when the sub system is removed from the host device as well as the function of the detection switch for detecting the removal of the sub system based on the advancement of the lever member are used to detect an illegal removal immediately, thus ensuring security.

In particular, according to at least an embodiment of the present invention, the lever member withdraws from the through hole and advances into the through hole. When the sub system is installed in the host device, [the lever member] withdraws from the through hole pushed by the host device. Therefore, there is no need to modify a device-fixing portion (such as a protrusion portion) formed on a panel of the host device, and thus there is no need to modify the host device. Consequently, convenience can be improved for the time when a sub system needs to be replaced in a host device. Thus, at least an embodiment of the present invention can increase not only security but also convenience.

The tamper detection mechanism wherein an end portion of the lever member facing the through hole is tapered toward a tip end, and the end portion is projected to an end portion of the through hole on the host device side.

According to at least an embodiment of the present invention, an end portion of the lever member facing the through hole is tapered toward a tip end and projected to an end portion of the through hole on the host device side. Therefore, the end portion of the lever member makes contact with the screw member in the vicinity of the border between the major diameter shaft portion and the minor diameter shaft portion; therefore, it can be detected that the screw member is even slightly loosened (that the screw member is slightly moved in the direction away from the host device), resulting in increased security.

The tamper detection mechanism wherein the diameter of the major diameter shaft portion and the diameter of the through hole are almost the same.

According to at least an embodiment of the present invention, the diameter of the major diameter shaft portion and the diameter of the through hole are almost the same; therefore, there is no wasted space in the lever member, thus increasing accuracy in tamper detection.

The tamper detection mechanism wherein the screw hole is formed in a first protrusion portion which projects from a mounting face of the host device on which the sub system is mounted, and the through hole is bored in the bottom of the recess portion provided in the sub system to accommodate the first protrusion portion.

According to at least an embodiment of the present invention, the above-described screw hole is formed in the first protrusion projecting from a mounting face of the host device on which the sub system is mounted, and the through hole is bored in the bottom of the recess portion provided in the sub system to accommodate the first protrusion portion; therefore, when a thread portion formed on the minor diameter shaft portion is screwed into the screw hole in the host device, the first protrusion portion cannot be seen from outside and also it is difficult to access the first protrusion portion from outside. Therefore, security can be further improved. Since the area (the end portion of the through hole on the host device side) where the host device and the sub device make contact with each other is arranged at the bottom of the labyrinth structure with alternating indentations and protrusions, access to the lever member from outside is made difficult, preventing the function of the lever member from being interfered with.

The tamper detection mechanism further comprising a second protrusion portion projecting from a mounting face of the host device on which the sub system is mounted and a pressing-detection means provided at the bottom of the recess portion for detecting the change in the pressing force caused as the second protrusion portion presses.

According to at least an embodiment of the present invention, the tamper detection mechanism is equipped with a second protrusion portion projecting from the mounting face of the host device on which the sub system is mounted and a pressing-detection means (such as a pressure switch) provided at the bottom of the above-mentioned recess portion for detecting the change in the pressing force caused as the second protrusion portion presses; therefore, even if the tamper detection function of the lever member does not work, illegal tampering can be prevented.

A card processing device equipped with the tamper detection mechanism, wherein the sub system is provided with a bezel having a front face and a card insertion slot exposed from an opening of the host device, a card processing section for the reading and writing of information on the card which is inserted at the card insertion slot, a casing that makes tight contact with the bezel to seal the card processing section, and a fixing face which is provided on the outside periphery of the front face and makes contact with the mounting face of the host device on which the sub system is mounted; and the recess portion is provided in the fixing face.

According to at least an embodiment of the present invention, in a card processing device equipped with the above-described tamper detection mechanism, a bezel, a card processing section, a casing and a fixing face are provided. Since the above-mentioned recess portion is formed in the fixing face, it would be difficult to gain access from outside to the fixing face which cannot be seen from outside; therefore, access to the recess portion is also made difficult, thus preventing the function of the lever member from being interfered with.

The card processing device wherein the lever member is extended from the bezel to the vicinity of the card processing section, and the detection switch is connected to the control circuit of the card processing section to detect the movement of the lever.

According to at least an embodiment of the present invention, the lever member is extended from the bezel to the vicinity of the card processing section, and the detection switch is connected to the control circuit of the card processing section to detect the movement of the lever; therefore, a tamper detection function with an inexpensive and simple configuration can be added to the card processing device.

The card processing device wherein when, based on the detection by the detection switch or the pressing-detection means, the possible removable of the sub system from the host device is detected, predetermined data in the card reader section is deleted from the card processing section.

According to at least an embodiment of the present invention, when the above-mentioned detection switch or the pressing-detection means detects the removal of the sub system, predetermined data in the card processing section is deleted; therefore, the leaking of important data can be prevented, realizing tighter security.

A tamper detection mechanism for detecting tampering against a sub system, comprising a fixing member which has a major diameter shaft portion and a minor diameter shaft portion and fixes the sub system into a host device, a through hole provided in the sub system, through which the major diameter shaft portion passes, a lever member which withdraws from the through hole as it is pushed by the major diameter shaft portion of the fixing member when the sub system is fixed and advances into the through hole when the fixing member is loosened, and a detection switch for detecting the tightly fixed condition or loosened condition of the fixing member based on the withdrawal or advancement of the lever member.

According to at least an embodiment of the present invention, a tamper detection mechanism for detecting tampering when a sub system is illegally removed from a host device is provided with a fixing member composed of a major diameter shaft portion and a minor diameter shaft portion, a through hole which the major diameter shaft portion passes through, a lever member which withdraws from the through hole as it is pushed by the major diameter shaft portion when the sub system is fixed and advances into the through hole when the fixing member is loosened, and a detection switch for detecting the (tightly) fixed condition or loosened condition of the fixing member based on the withdrawal or advancement of the lever member; therefore, while the security function is ensured, convenience can be increased.

According to the tamper detection mechanism and the card processing device of at least an embodiment of the present invention, when a sub system (card processing device) is removed from a host device, the removal is immediately detected by a lever member and a detection means; therefore, security is ensured. Also, the lever member withdraws from and advances into the through hole; therefore, even for replacing the sub system (the card processing device), there is no need to modify a device-fixing portion formed in a panel of the host device, thus increasing convenience. Particularly, when [the lever member] withdrawal and advancement happen inside the through hole, access from outside is made difficult and therefore, security is further improved.

BRIEF DESCRIPTION OF DRAWING

Embodiments will now be described, by way of example only, with reference to the accompanying drawings which are meant to be exemplary, not limiting, and wherein like elements are numbered alike in several Figures, in which.

DETAILED DESCRIPTION OF PREFERRED EMBODIMENTS

Figure 1:
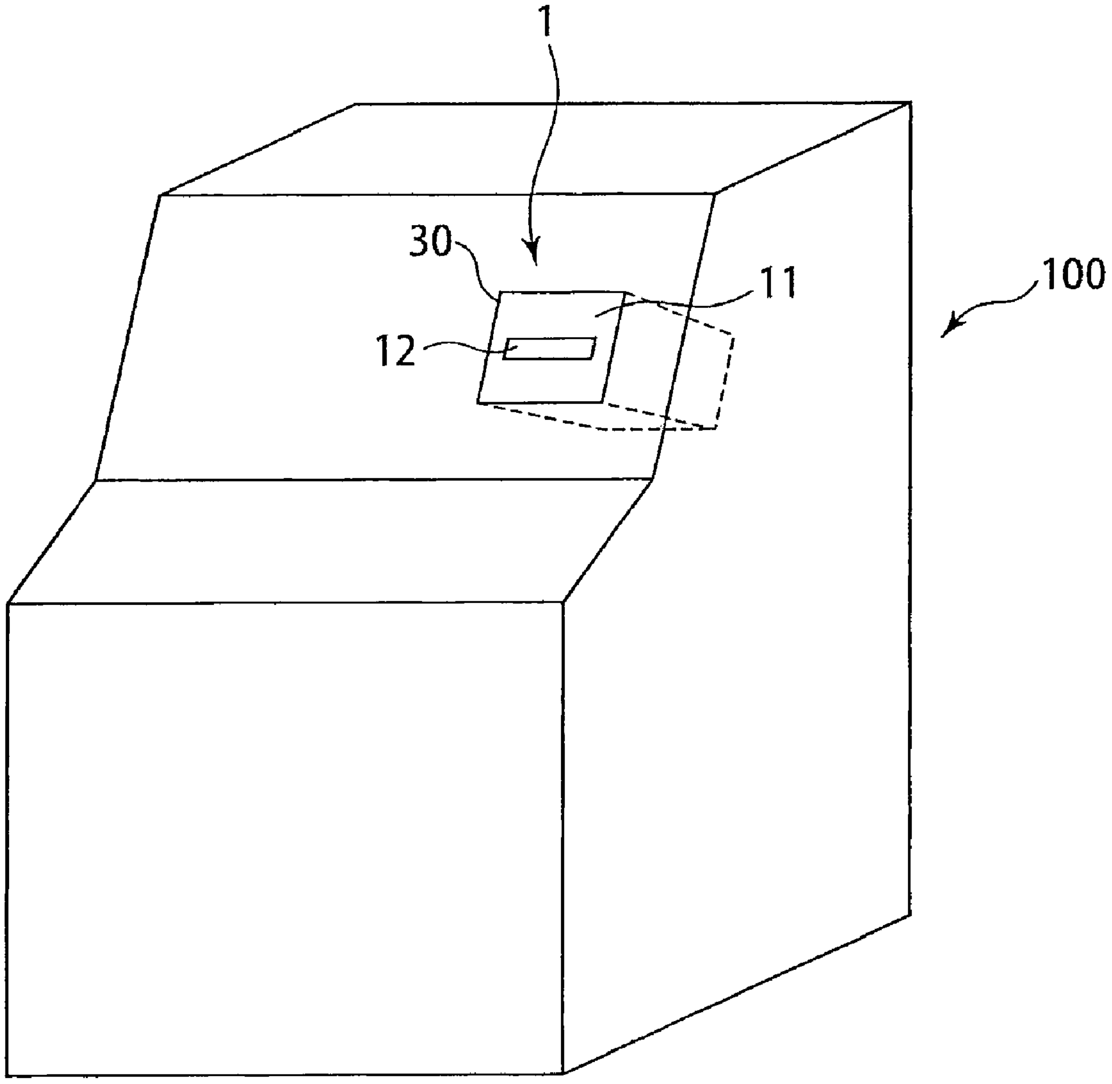
FIG. 1 is a diagram showing a card reader of at least an embodiment of the present invention mounted in a host device.

Embodiments of the present invention are described hereinafter referring to the drawings.

Figure 2:
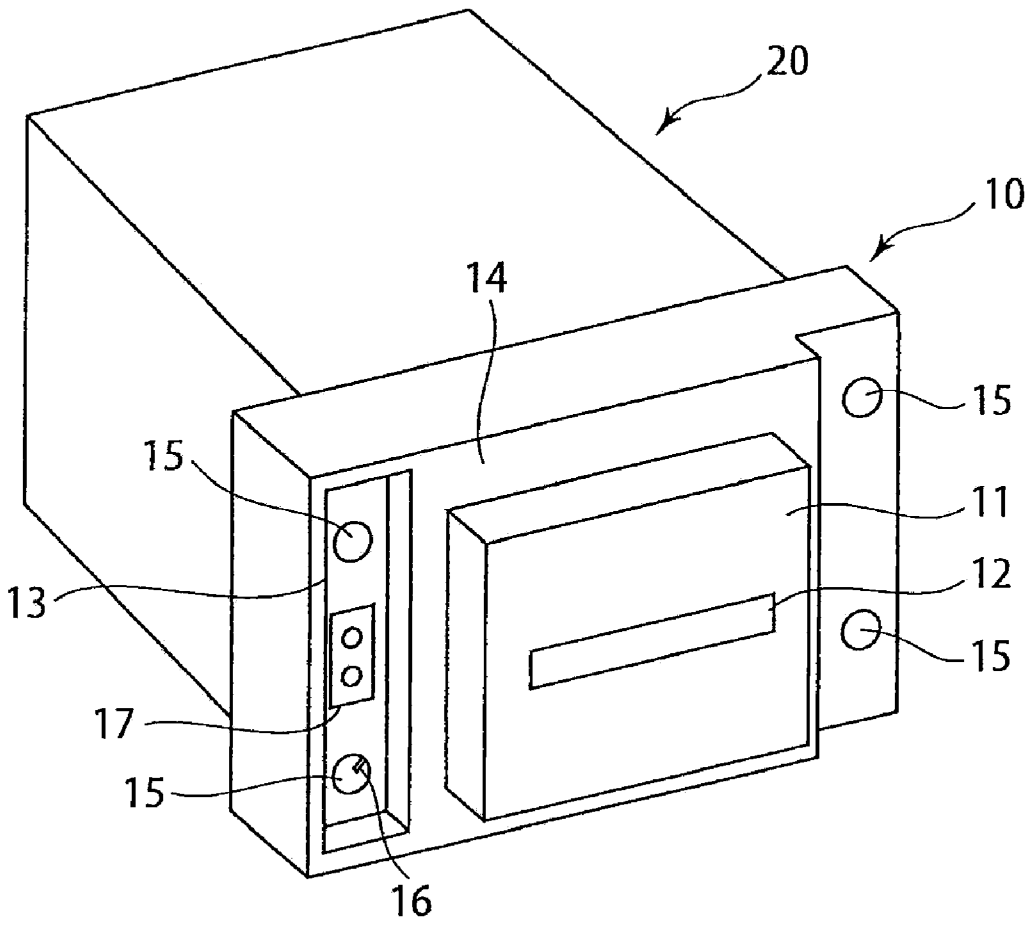
FIG. 2 is a perspective view of an external appearance of the card reader of at least an embodiment of the present invention.

FIG. 1 is a diagram showing that a sub system (such as a card reader) 1 of at least an embodiment of the present invention is installed in a host device 100 (such as an ATM or kiosk). FIG. 2 is a perspective view of the external appearance of the card reader 1 of at least an embodiment of the present invention. Note that although the card reader 1 shown in FIG. 1 is employed as an example of a card processing device in this embodiment, at least an embodiment of the present invention can be applied to other kinds of card readers.

In FIG. 1 and FIG. 2, the card reader 1 is equipped with a bezel 10 having a front face 11 and a card insertion slot 12 which are exposed from an opening of the panel 30 of the host device 100, a card processing section (not shown). Configured by an electrical component such as a CPU, ROM or RAM) for reading and writing information on the card inserted at the card insertion slot 12, and a casing 20 which makes tight contact with the bezel 10 to seal the card processing section. Note that the casing 20 is attached to the bezel 10 by screws which are not illustrated.

In the bezel 10, a fixing face 14 is formed around the outside periphery of the front face 11 to make contact with the mounting face 100A of the host device 100 onto which the card reader 1 is mounted.

The front face 11 and the fixing face 14 are formed in a step that steps back from the panel 30 toward the inside of the host device 100. In other words, the front face 11 is formed on the front side (near side in FIG. 2) relative to the plane including the fixing face 14. Because of this, only the front face 11 can be seen from outside via the panel 30, but the fixing face 14 cannot be seen from outside.

As shown in FIG. 2, in the card reader 1 of this embodiment, a recess portion 13 is formed on one side of the fixing face 14 (on the right side in FIG. 2). Also, (two) through holes 15 are formed in the bottom of the recess portion 13. (Note that the bezel 10 has four through holes 15 in total). Inside of one of the through holes 15, a lever member 16 is provided. Also, in the recess portion 13, a sheet switch 17 is provided at a place different from those of the through holes 15. A tamper detection mechanism that uses the lever member 16 or the sheet switch 17 will be described in detail referring to FIG. 3 and FIG. 4.

Note that in FIG. 2, the lever member 16 is provided in one of the four through holes 15, which is located on the bottom left when seen from the front side; however, it can be provided in any location. Also, [a lever member] can be provided in each of the multiple through holes 15. The card reader 1 is screwed onto the panel 30 of the host device 100 by using the through holes 15 (the screws are not illustrated). In other words, the card reader 1 is screwed through the through holes 15 from the back side (the far side in FIG. 2) of the fixing face 14.

Tamper Detection Mechanism

Figure 3:
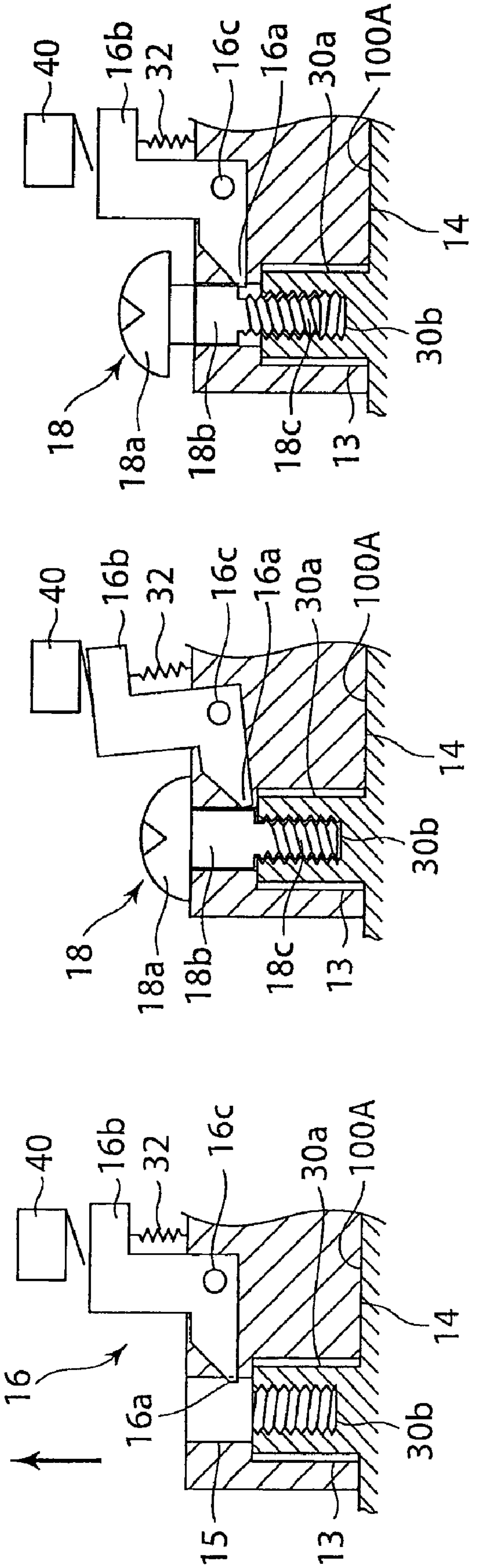
FIGS. 3(*a*)-3(*c*) are explanatory diagrams to explain a detection mechanism that uses a lever member in the tamper detection mechanism of at least an embodiment of the present invention.

FIG. 3 is an explanatory illustration to explain a detection mechanism that uses the lever member 16 in the tamper detection mechanism of at least an embodiment of the present invention.

Tampering is a physical attack against the card reader which is a sub system, such as an illegal act of removing the case of the card reader 1 or an illegal act of removing the card reader 1 itself from the host device.

In FIG. 3(*a*), the fixing face 14 of the card reader 1 is in contact with a mounting face 100A of the panel 30. Also, in the panel 30, a first protrusion portion 30*a* is formed projecting from the mounting face 100A and a screw hole 30*b* is bored in the center of the first protrusion portion 30*a*.

The recess portion 13 is provided in the fixing face of the card reader 1 so as to accommodate the first protrusion portion 30*a*. As described above, the through hole 15 is formed in the bottom of the recess portion 13, and the end portion 16*a* of the lever member 16 is advanced into the through hole 15.

The lever member 16 moves together with a lever portion 16*b* so as to let the end portion 16*a* withdraw from the through hole 15 or let the end portion 16*a* advance into the through hole 15. Also, as shown in FIG. 3, the lever member 16 of this embodiment is provided with a supporting point 16*c* near the end portion 16*a*, and the lever member 16 is moved around the supporting point 16*c* as a center. Also, lever portion 16*b* is connected with a return spring 32, and the lever member 16 is moved clockwise around the supporting point 16*c* as a center by the urging force of the return spring 32 in FIG. 3, by which the end portion 16*a* of the lever member 16 is advanced into the through hole 15 (see FIG. 3(*a*)).

A micro switch 40 is arranged on the lever portion 16*b* on the card insertion direction side (see arrow in FIG. 3(*a*)) to detect the movement of the lever portion 16*b* which moves together with the lever member 16. Note that the lever member 16 is extended from the bezel 30 to the vicinity of the card processing section, and the micro switch 40 is connected to the control circuit of the card processing section to detect the movement of the lever member 16.

Also, if the movement of the lever member 16 is detected, that is, the possible removal of the card reader 1 from the host device 100 (for example, a screw member 18 to be described later is loosened) is detected, predetermined data (secret data) in the card processing section is deleted, and thus the predetermined data (secret data) is prevented from leakage or alteration.

Next, FIG. 3(*b*) and FIG. 3(*c*) show how tampering is detected in the card reader 1.

As shown in FIG. 3(*b*), the card reader 1 is mounted onto the panel 30 of the host device 100 by screw members 18 which are the fixing member. More specifically described, each screw member 18 is composed of a head portion 18*a*, a major diameter shaft portion 18*b* and a minor diameter shaft portion 18*c*, and a thread portion formed on the minor diameter shaft portion 18*c* (a surface of the minor diameter shaft portion 18*c*) is screwed into a screw hole 30*b* of the host device 100 to fix the card reader 1 to the host device 100. Also, the minor diameter shaft portion 18*c* and major diameter shaft portion 18*b* of the screw member 18 pass through the through hole 15 (completely or partially) provided in the recess portion 13 of the card reader 1.

The end portion 16*a* of the lever member 16 is pushed by the major diameter shaft portion 18*b* when the screw member 18 is tightly screwed in (tightly screwed condition), and the end portion 16*a* is moved counterclockwise around the supporting point 16*c* as a center against the urging force of the return spring 32 and then withdraws from the through hole 15. On the other hand, when the screw member 18 is loosened (loose condition), the end portion 16*a* is moved clockwise around the supporting point 16*c* as a center by the urging force of the return spring 32 to advance into the through hole 15. FIG. 3(*b*) shows that the tightly screwed condition.

As shown in FIG. 3(*c*), when the screw member 18 is loosened, the screw member 18 moves in the card insertion direction to change from the tightly screwed condition to a loosened condition. At that time, since there is a step in the radial direction between the minor diameter shaft portion 18*c* and the major diameter shaft portion 18*b* of the screw member 18, the end portion 16*a* of the lever member 16 advances into the through hole 15. Accordingly, the micro switch 40 is switched between ON/OFF.

The micro switch 40 is turned OFF when the end portion 16*a* of the lever member 16 is advanced into the through hole 15 due to the urging force of the return spring 32. On the other hand, when the panel 30 is attached and the end portion 16*a* of the lever member 16 is pushed by the major diameter shaft portion 18*b* of the screw member 18 and withdraws from the through hole 15 against the urging force of the spring 32, the micro switch 40 is turned ON. Therefore, with the micro switch 40 that is operated as described, a tightly screwed condition or loosened condition of the screw member 18 can be detected based on the advancement or withdrawal of the lever member 16, and thus, the illegal removal of the card reader 1 from (the panel 30 of) the host device 100 can be detected.

Note that a rotary type or slide type lever member 16 may be adopted. When a rotary type is used, the lever member 16 is moved around the supporting point 16*c* as a center. When a slide type is used, [the lever member 16] slides back and forth freely in the direction almost perpendicular to the screw member 18. Although the micro switch 40 is adopted as an example of a detection switch in this embodiment, it can be by any kind such as a leaf switch or a light-shield switch.

Also, in this embodiment, the end portion 16*a* of the lever member 16 facing the through hole 15 is tapered toward the tip end and protrudes to the end portion of the through hole 15 on the host device 100 side; however, the present invention is not limited to this. In other words, the end portion 16*a* can be in any shape, and the end portion 16*a* can be advanced from any part of the through hole 15. Further, in this embodiment, the diameter of the major diameter shaft portion 18*b* of the screw member 18 and the diameter of the through hole 15 are almost the same; however, the present invention is not limited to this embodiment.

Figure 4:
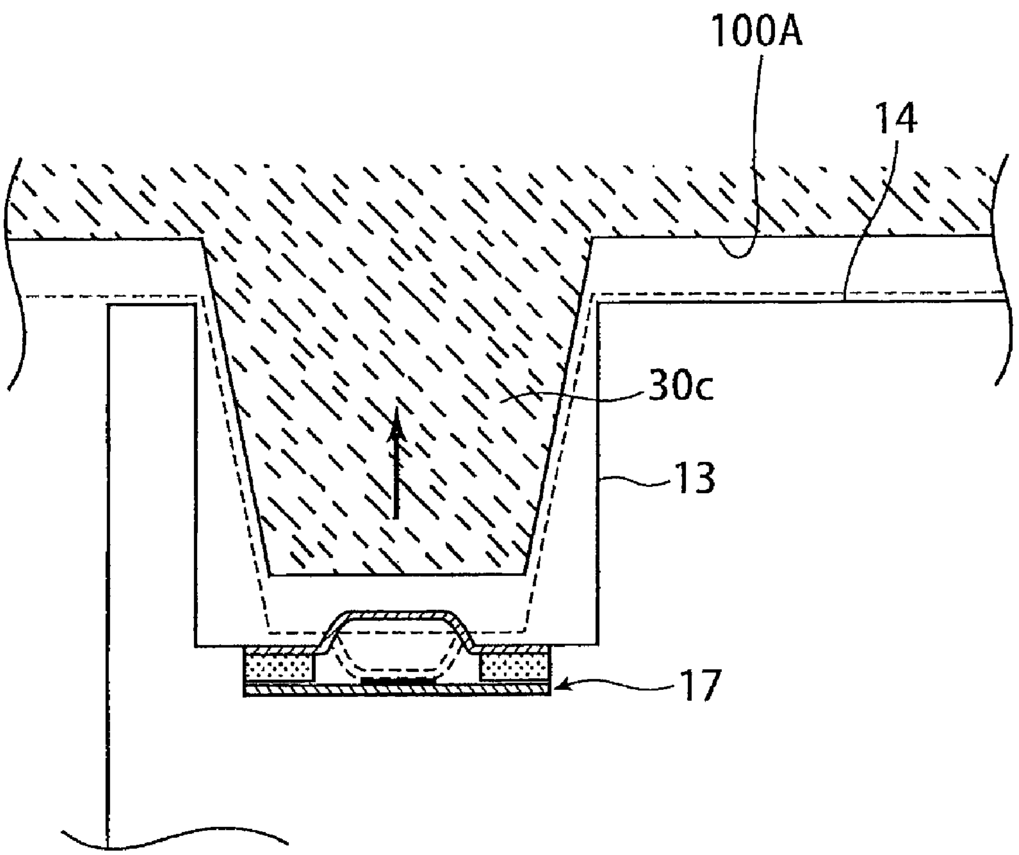
FIG. 4 is an explanatory diagram to explain a detection mechanism that uses a sheet switch in the tamper detection mechanism of at least an embodiment of the present invention.

FIG. 4 is an explanatory diagram to explain a detection mechanism using a sheet switch 17 in the tamper detection mechanism of at least an embodiment of the present invention.

In FIG. 4, a sheet switch 17 is provided at the bottom of the recess portion 13 created in the fixing face 14 of the card reader 1. The switch can detect the change in the pressing force of the second protrusion portion 30*c* projecting from the mounting face 100A of the host device 100. Since such a sheet switch 17 is provided, even if the screw member 18 which is a fixing member is pulled out [in order to repair] some kind of breakdown, tampering can be detected as soon as the card reader 1 is removed from the host device 100, further improving security.

Note that "the pressing-detection means" can be any means such as a pressure switch or a pressure sensor as long as it detects the change in the pressing force of the second protrusion portion 30*c*.

As described above, according to the card reader 1 of this embodiment, the function of the lever member 16 whose end portion 16*a* advances when [the card reader] is removed from the host device 100 and the function of the micro switch 40 for detecting the removal of the card reader 1 based on the advancement of the lever member 16 are used to immediately detect an illegal removal, thus ensuring security.

Since the end portion 16*a* of the lever member 16 automatically withdraws due to the first protrusion portion 30*a* of the host device 100 that comes into the through hole 15, there is no particular need to modify the shape of the first protrusion portion 30*a* even for replacing the card reader 1. Therefore, convenience can be increased for replacing the card reader 1 in the host device 100.

By configuring the lever member 16 such that the end portion 16*a* of the lever member 16 advances into the through hole 15, access from outside is made difficult, thus preventing tampering.

The screw member 18 which is a fixing member used in the tamper detection mechanism of this embodiment is constructed with the head portion 18*a*, the major diameter shaft portion 18*b* and the minor diameter shaft portion 18*c*, and the end portion 16*a* of the lever member 16 makes contact with the screw member 18 in the vicinity of the border between the major diameter shaft portion 18*b* and the minor diameter shaft portion 18*c*; therefore, a slight loosening of the screw member 18 can be detected, thus increasing the security level.

Also, in this embodiment, the diameter of the major diameter shaft portion 18*b* and the diameter of the through hole are almost the same; therefore, there is no wasted space in the lever member 16, resulting in increased accuracy in the detection of tampering.

Also, the through hole 15 is bored in the bottom of the recess portion 13; therefore, the first protrusion portion 30*a* cannot be seen or accessed from outside. Because of this, security can be further improved.

Further, in the card reader 1 of this embodiment, the sheet switch 17 as the tamper detection mechanism is also used for detection (see FIG. 4). The sheet switch 17 is provided at the bottom of the labyrinth structure with alternating indentations and protrusions; even if the lever member 16 is out of order, an illegal removal of the card reader 1 from the host device 100 can be detected. Therefore, security can be further increased.

Also, since the lever member 16 and the micro switch 40 used for the tamper detection mechanism are widely-used members/components, a tamper detection mechanism with an inexpensive and simple configuration can be added to the card reader 1.

Further, when the possible removal of the card reader 1 from the host device 100 (the screw member 18 is loosened, for example) is detected as described above, predetermined data (secret data) in the card processing section is deleted; therefore, important data and confidential data is protected from leaking, and thus tighter security can be provided.

Although, in the card reader 1 of this embodiment, the lever member 16 is withdrawn by using the screw member 18, at least an embodiment of the present invention may adopt a lever member 16 which withdraws as it is pushed by a device fixing portion (such as a protrusion portion of the host device) under the condition where the card reader 1 is attached to the panel 30 and advances when the card reader 1 is removed from the panel. More specifically described, the fixing face 14 of the card reader 1 is formed in a step that steps back from the front face 11 toward the inside of the device, and the lever member 16 is configured to protrude from the fixing face 14 to the device fixing portion (such as the protrusion portion) of the panel 30. In this way, there is no need to modify the device fixing portion formed in the panel 30 of the host device 100; therefore, convenience can be increased for the time when the card reader 1 is replaced in the host device 100.

At that time, a peripheral contact portion may be provided around the outside periphery of the front face 11 to make contact with an opening periphery of the panel 30 on the inner side of the device. With this, tampering from the front side can be effectively prevented.

The card processing device of at least an embodiment of the present invention is useful because it detects its illegal removal from the host device, ensures security, and increases convenience for the replacement of the card processing device.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A tamper detection mechanism for detecting tampering when a sub system is removed from a host device, comprising:

- a screw member comprising a head portion, a major diameter shaft portion and a minor diameter shaft portion and which a thread portion formed on said minor diameter shaft portion is screwed into a screw hole in said host device to fix said sub system to said host device;
- a through hole which is provided in said sub system and through which said major diameter shaft portion passes;
- a lever member which withdraws from said through hole as the lever member is pushed by said major diameter shaft portion when said screw member is tightly screwed, and advances into said through hole when said screw member is loosened; and
- a detection switch which detects a tightly screwed condition or a loosened condition of said screw member based on the withdrawal or advancement of said lever member;
- wherein when said screw member is loosened, the lever member advances into a space of said through hole which is formed by a diameter difference in a radial direction between the minor diameter shaft portion and the major diameter shaft portion and thereby the loosened condition of said screw member is detected by the detection switch.

2. The tamper detection mechanism as set forth in claim 1 wherein an end portion of said lever member facing said through hole is tapered toward a tip point, and said end portion is projected to an end portion of said through hole on said host device side.

3. The tamper detection mechanism as set forth in claim 1 wherein a diameter of said major diameter shaft portion and a diameter of said through hole are almost the same.

4. The tamper detection mechanism as set forth in claim 1 wherein said screw hole is formed in a first protrusion portion that protrudes from a mounting face of said host device to which said sub system is attached, and said through hole is formed in a bottom of a recess portion cut in said sub system to accommodate said first protrusion portion.

5. The tamper detection mechanism as set forth in claim 1 which is provided with a second protrusion portion projecting from a mounting face of said host device, to which said sub system is attached, and a pressing-detection means for detecting changes in the pressing force caused when said second protrusion portion presses.

6. A card processing device equipped with the tamper detection mechanism described in claim 1, wherein

- said sub system is equipped with a bezel having a front face and a card insertion slot exposed from an opening of said host device,
- a card processing section that reads and writes information on a card inserted at said card insertion slot,
- a casing which is tightly fixed to said bezel to seal said card processing section, and
- a fixing face which is provided around an outer periphery of said front face to make contact with said mounting face of said host device to which said sub system is attached; and
- said recess portion is provided in said fixing face.

7. The card processing device as set forth in claim 6 wherein said lever member is extended from said bezel to the vicinity of said card processing section; and said detection switch is connected with a control circuit of said card processing section to detect movement of said lever member.

8. The card processing device as set forth in claim 6 wherein when said detection switch detects possible removal of said sub system from said host device based on the detection by a pressing-detection mean, predetermined data in said card processing section is deleted.

9. A tamper detection mechanism which detects whether a sub system has been tampered with, comprising:

- a fixing member which has a major diameter shaft portion and a minor diameter shaft portion and fixes said sub system to a host device;
- a through hole which is provided to said sub system and through which said major diameter shaft portion passes;
- a lever member which withdraws from said through hole as the lever member is pushed by said major diameter shaft portion when said fixing member is tightly fixed, and advances into said through hole when said fixing member is loosened; and
- a detection switch which detects the a tightly fixed condition or a loosened condition of said fixing member based on the withdrawal or advancement of said lever member;
- wherein when said screw member is loosened, the lever member advances into a space of said through hole which is formed by a diameter difference in a radial direction between the minor diameter shaft portion and the major diameter shaft portion and thereby the loosened condition of said screw member is detected by the detection switch.

* * * * *